(12) United States Patent
Wyse et al.

(10) Patent No.: US 8,561,466 B2
(45) Date of Patent: *Oct. 22, 2013

(54) VIBRATORY GYRO BIAS ERROR CANCELLATION USING MODE REVERSAL

(75) Inventors: Stanley F. Wyse, Encino, CA (US); Robert E. Stewart, Woodland Hills, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 436 days.

This patent is subject to a terminal disclaimer.

(21) Appl. No.: 12/930,289

(22) Filed: Jan. 3, 2011

(65) Prior Publication Data
US 2011/0100121 A1 May 5, 2011

Related U.S. Application Data

(62) Division of application No. 11/499,958, filed on Aug. 7, 2006, now Pat. No. 7,886,598.

(51) Int. Cl.
*G01C 19/56* (2012.01)

(52) U.S. Cl.
USPC ........................................ 73/504.12

(58) Field of Classification Search
USPC .............................. 73/504.12, 504.14, 504.15
See application file for complete search history.

(56) References Cited

U.S. PATENT DOCUMENTS 5,256,929 A * 10/1993 Terajima .................... 73/504.14

* cited by examiner

*Primary Examiner* — John Chapman, Jr.
(74) *Attorney, Agent, or Firm* — Carmen Patti Law Group, LLC

(57) ABSTRACT

The method and apparatus in one embodiment may have: providing a two-dimensional oscillator having a beam containing two principal elastic axes and two principal damping axes; driving the beam with drive components to oscillate across corners of the beam at approximately 45 degrees to sides of the beam, the drive components having forcer components that provide drive and pickoff components that provide feedback; and oscillating the beam in a normal mode and a reverse mode.

17 Claims, 4 Drawing Sheets

FIG. 5

SIMULATION RESULTS FOR DIAGONAL AXIS DRIVE (AT 45 DEGREES TO X & Y)
FORM=130 RAD/SEC AND $2\tau=0.0013$; 1000:1 FREQ SCALING
(SCALED FOR A~ 20.7KHz BEAM FREQ. WITH A Q OF 100000)

| CONDITION | MODE | INPUT RATE $\alpha$ R/SEC | MISALIGNMENTS |  |  |  |  | PA ANGLES |  | MEASUREMENT |  |
|---|---|---|---|---|---|---|---|---|---|---|---|
|  |  |  | $\beta$ RAD | $\theta_x$ RAD | $\theta_y$ RAD | $\Delta(1/\tau)$ 1/SEC | $\Delta\omega$ R/SEC | $\theta_\tau$ DEG | $\theta_\omega$ DEG | RATE DEG/HR | QUAD DEG/HR |
| REFERENCE (IDEAL GYRO) | NORMAL | 0 | 0 | 0 | 0 | 0 | 0 |  |  | <1e-6 | <1e-6 |
| WITH NO MISALIGNMENTS (0ΔS) | REVERSE | 0 | 0 | 0 | 0 | 0 | 0 |  |  | <1e-6 | <1e-6 |
| 1 RAD/SEC INPUT | NORMAL | 1 | 0 | 0 | 0 | 0 | 0 |  |  | 206265 | 81.546* |
| AND NO MISALIGNMENTS | REVERSE | 1 | 0 | 0 | 0 | 0 | 0 |  |  | -206265 | -81.546* |
| FORCERS AND PICKOFFS | NORMAL | 0 | 0.001 | 0.001 | -0.001 | 0 | 0 |  |  | <1e-6 | <1e-6 |
| ROTATED CCW BY 1 MRAD | REVERSE | 0 | 0.001 | 0.001 | -0.001 | 0 | 0 |  |  | <1e-6 | <1e-6 |
| FORCERS AND PICKOFFS ALIGNED, | NORMAL | 0 | 0 | 0.001 | -0.001 | 0 | 0 |  |  | -134.04 | -1.615** |
| BUT NOT ORTHOGONAL BY 1 MRAD | REVERSE | 0 | 0 | 0.001 | -0.001 | 0 | 0 |  |  | -134.04 | -1.615** |
| $\Delta(1/\tau)$: $\tau_x=0.999\tau_y$ | NORMAL | 0 | 0 | 0 | 0 | 6.5E-07 | 0 | 45 |  | -67.04 | -0.026 |
| OTHERWISE PERFECT SYMMETRY | REVERSE | 0 | 0 | 0 | 0 | 6.5E-07 | 0 | 45 |  | -67.04 | -0.026 |
| $\Delta\omega=0.00013$ RAD/SEC (1PPM) | NORMAL | 0 | 0 | 0 | 0 | 0 | 0.00013 |  | 45 | <1e-6 | -13400 |
| OTHERWISE PERFECT SYMMETRY | REVERSE | 0 | 0 | 0 | 0 | 0 | 0.00013 |  | 45 | <1e-6 | -13400 |
| X-AXIS FORCER MISALIGNMENT | NORMAL | 0 | 0 | 0.001 | 0 | 0 | 0 |  |  | <1e-6 | 1.615** |
| ONLY (1 MRAD) | REVERSE | 0 | 0 | 0.001 | 0 | 0 | 0 |  |  | 134.04 | 1.615** |
| Y-AXIS PICKOFF MISALIGNMENT | NORMAL | 0 | 0 | 0 | 0.001 | 0 | 0 |  |  | <1e-6 | <1e-6 |
| ONLY (1 MRAD) | REVERSE | 0 | 0 | 0 | 0.001 | 0 | 0 |  |  | 134.04 | 1.615** |

* A SMALL PHASE SHIFT ERROR IN THE RATE FEEDBACK REQUIRED SOME QUADRATURE REBALANCE FORCE.

** DITHER DRIVING FORCE IS NOT EXACTLY 90 DEGREES OUT OF PHASE WITH THE DITHER AMPLITUDE, SO SOME "QUADRATURE" COUPLING OCCURS SINCE THE PEAK DRIVING FORCE DOES NOT ACT AT PEAK DRIVE VELOCITY.

VIBRATORY GYRO BIAS ERROR CANCELLATION USING MODE REVERSAL

CROSSREFERENCE TO RELATED APPLICATIONS

This application is a divisional application of U.S. Ser. No. 11/499,958, filed Aug. 7, 2006 now U.S. Pat. No. 7,886,598, and assigned to the same assignee as the parent application.

This application contains subject matter that is related to the subject matter of the following applications, which is assigned to the same assignee as this application.

"Bias and Quadrature Reduction in Class II Coriolis Vibratory Gyros", Ser. No, 11/499,957, filed Aug. 7,2006 (NGC-279/001039-199).

"Method for Modifying the Location of Nodal Points of a Vibrating Beam", Ser. No. 11/499,956, filed Aug. 7,2006 (NGC-282/001047-199).

The below-listed application is hereby incorporated herein by reference in its entirety. "Oscillation of Vibrating Beam in a First Direction for a First Time Period and a Second Direction for a Second Time Period to Sense Angular Rate of the Vibrating Beam," by Robert E. Stewart, application Ser. No. 11/057,324, filed Feb. 11, 2005.

TECHNICAL FIELD

The invention relates generally to electromechanical systems and more particularly to drive and sense modes of vibrating beams.

BACKGROUND

An electromechanical system in one example measures a parameter. The electromechanical system may comprise a micro-electromechanical system ("MEMS") accelerometer or gyroscope that measures the parameter. For example, the accelerometer measures an acceleration and the gyroscope measures an angular rate (e.g., rotation). The gyroscope in one example comprises a vibrating beam with high Q degenerate fundamental modes of vibration. For example, high Q vibrating beams require little energy to sustain vibration. The vibrating beam in one example is employable for high performance closed loop angular rate sensing. The vibrating beam in another example is employable for lower performance open loop angular rate sensing. The mathematical model of the symmetrical vibrating beam is in many aspects similar to a vibrating ring or hemispherical resonator gyroscope ("HRG"). The analytical similarity to the hemispherical resonator gyroscope indicates that the vibrating beam gyroscope has the potential of achieving similar performance.

Drive components coupled with the vibrating beam cause a first oscillation of the vibrating beam. An angular rate of the vibrating beam and the first oscillation induce a Coriolis force on the vibrating beam. For example, the angular rate is about the longitudinal axis of the vibrating beam. The Coriolis force causes a second oscillation of the vibrating beam. The second oscillation is substantially perpendicular to the first oscillation. Feedback components in one example provide feedback on a magnitude of the first oscillation to the drive components for regulation of the first oscillation. Pickoff sensor components sense the second oscillations and apply control signals to null the pickoff signal. The control signals are a measure of the magnitude and polarity of the angular rate of the vibrating beam.

There is a need in the art for an improved vibrating beam gyroscope that has improved bias reduction and/or cancellation.

SUMMARY

One embodiment of the present method and apparatus encompasses an apparatus. The apparatus may comprise: a two-dimensional axisymmetric oscillator having a beam containing two principal elastic axes and two principal damping axes; and drive components operatively coupled to the beam, the drive components driving the beam to oscillate across corners of the beam at approximately 45 degrees to sides of the beam.

Another embodiment of the present method and apparatus encompasses a method. The method may comprises: providing a two-dimensional axisymmetric oscillator having a beam containing two principal elastic axes and two principal damping axes; driving the beam with drive components to oscillate across corners of the beam at approximately 45 degrees to sides of the beam, the drive components having forcer components that provide drive and pickoff components that provide feedback; and oscillating the beam in a normal mode and a reverse mode.

DESCRIPTION OF THE DRAWINGS

Features of exemplary implementations of the invention will become apparent from the description, the claims, and the accompanying drawings in which:

FIG. 5 shows a table of the results of simulations for operation in both the normal mode and the reverse mode for various axis alignments, and for time-constant and resonant frequency differences along the principal axes.

DETAILED DESCRIPTION

Vibratory gyros may be a collective name for mechanical devices that in various ways use Coriolis acceleration to sense rotation. These gyros appear in a large number of shapes and are also known as tuning forks, vibrating disks, vibrating wine glass etc.

Figure 1:
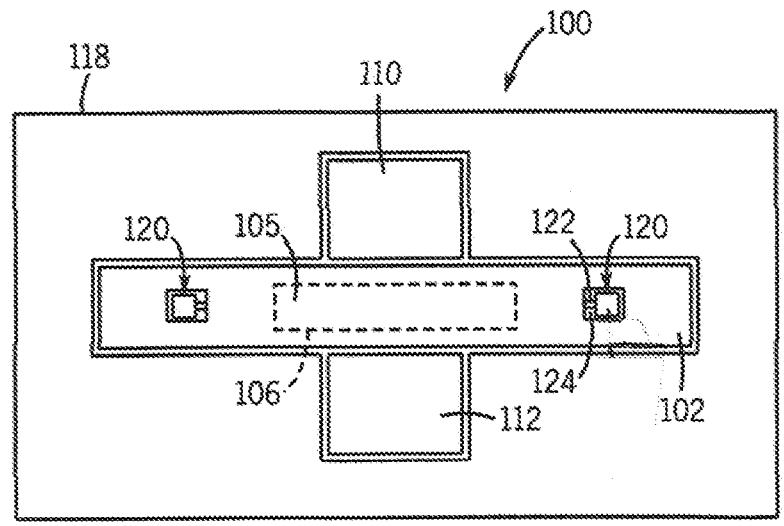
FIG. 1, depicts an apparatus having a micro-electromechanical system ("MEMS") gyroscope.

Turning to FIG. 1, an apparatus 100 in one embodiment comprises a micro-electromechanical system ("MEMS") gyroscope. The gyroscope is employable for high accuracy navigation angular rate sensing. The apparatus 100 in one example has a vibrating beam 102 and a plurality of drive/sensor components 105, 106, 110, and 112. Depending on an oscillation mode of the vibrating beam 102, a first subgroup of the drive/sensor components 105, 106, 110, and 112 drive a first oscillation of the vibrating beam 102 and a second subgroup of the drive/sensor components 105, 106, 110, and 112 sense a second Coriolis induced oscillation of the vibrating beam 102.

In one example, the drive oscillation of the vibrating beam 102 is along a first direction (e.g., out-of-plane). So, the drive/sensor components 105 and 106 serve as drive components for the vibrating beam 102 and the drive/sensor components 110 and 112 serve as pickoff/forcer rebalance components for the vibrating beam 102. In another example, the drive oscillation of the vibrating beam 102 is along a second direction (e.g., in-plane). So, the drive/sensor components 110 and 112 serve as drive components for the vibrating beam 102 and the drive/sensor components 105 and 106 serve as pickoff/forcer rebalance components for the vibrating beam 102.

The vibrating beam 102 comprises one or more nodal axes for vertical oscillation (e.g., vertical vibration). For example, vertical oscillation of the vibrating beam 102 may occur about the nodal axes. The vibrating beam 102 may also have one or more nodal axes for horizontal oscillation (e.g., horizontal vibration). For example, horizontal oscillation of the vibrating beam 102 may occur about the nodal axes. The nodal axis for vertical oscillation and the nodal axis for horizontal oscillation in one example intersect at a nodal point. The nodal point remains substantially still for oscillation in any one or more of a plurality of substantially perpendicular directions. For example, the nodal point remains substantially still during both vertical oscillation and horizontal oscillation. The vibrating beam 102 may have one or more connection components 120 that serve to connect a frame 118 with the vibrating beam 102 at the nodal point of the vibrating beam 102.

The vibrating beam 102 in one example is supported by a flexure component 122 connected to the frame 118 through connection components 120 top and bottom covers (not shown). The flexure component 122 allows movement of the vibrating beam 102 about the nodal point upon occurrence of an angular rate. For example, the angular rate is about the longitudinal axis of the vibrating beam. Pickoff sensors and processing components measure and translate the movement of the vibrating beam 102 into a signal representing the direction and magnitude of the angular rate.

The flexure component 122 allows horizontal and vertical oscillation of the vibrating beam 102 about the nodal point. The flexure component 122 may have a reduced section of the vibrating beam 102 that lies along a center line of a longitudinal axis of the vibrating beam 102. The nodal point in one example is internal to the vibrating beam 102. For example, the vibrating beam 102 may have one or more apertures 124 that expose an area around the nodal point. The aperture 124 in one example passes through the vibrating beam 102. The aperture 124 surrounds the nodal point and the flexure component 122 to provide space for movement of the vibrating beam 102. The aperture 124 is near the nodal point. The aperture 124 allows the frame 118 to support the vibrating beam substantially near the nodal point. The aperture 124 may have an open space etched from a surface of the vibrating beam 102 to expose the nodal point and form the flexure component 122.

To initialize an angular rate sensing gyroscope, the drive components of the drive/sensor components 105, 106, 110, and 112 cause a first oscillation of the vibrating beam 102. An angular rate of the vibrating beams 102 about its longitudinal axes and the first oscillation induce a Coriolis force on the vibrating beam 102. The Coriolis force causes a second oscillation of the vibrating beam 102. The second oscillation is substantially perpendicular to the first oscillation. Feedback components in one example provide feedback on a magnitude of the first oscillation to the drive component 106 for regulation of the first oscillation. The sensor components of the drive/sensor components 105, 106, 110, and 112 pickoff the second oscillations and apply control signals to null the pickoff signal. The control signals are a measure of the magnitude and polarity of the angular rate of the vibrating beam 102.

The drive components of the drive/sensor components 105, 106, 110, and 112 in one example may have electrostatic drive components, magnetic drive and/or piezoelectric drive components. The sensor components of the drive/sensor components 105, 106, 110, and 112 in one example may have capacitive pickoff sensors, magnetic pickoff sensors, piezoresistive sensors, and/or piezoelectric pickoff sensors.

One gyro embodiment according to the present method and apparatus may be modeled as a two-dimensional axisymmetric oscillator having a beam containing two principal elastic axes and two principal damping axes. Rather than driving the beam to oscillate in a plane parallel to the sides of the beams, the beam in an embodiment according to the present method and apparatus is driven to oscillate across the corners of the beam at 45 degrees or approximately 45 degrees to these sides (e.g., essentially in a plane parallel to the diagonal of the beam cross-section).

By using this special technique of driving the beam to oscillate along the diagonal, in combination with using the method of aligning the capacitive pickoffs and forcers, three major enhancements in performance may be achieved, namely:

(1) Bias in the rate measurement, that normally occurs due to differential time-constant and unequal frequencies along the principal axes, will cancel when the modes are reversed.

(2) Bias in the rate measurement is minimal even if the shape of the beam cross-section is asymmetric, i.e., if the cross-section is rhombic rather than square. The bias is minimized even without mode reversal.

(3) Bias in the rate measurement will cancel with mode reversal even if the gaps and gains are different between the two axes.

Figure 2:
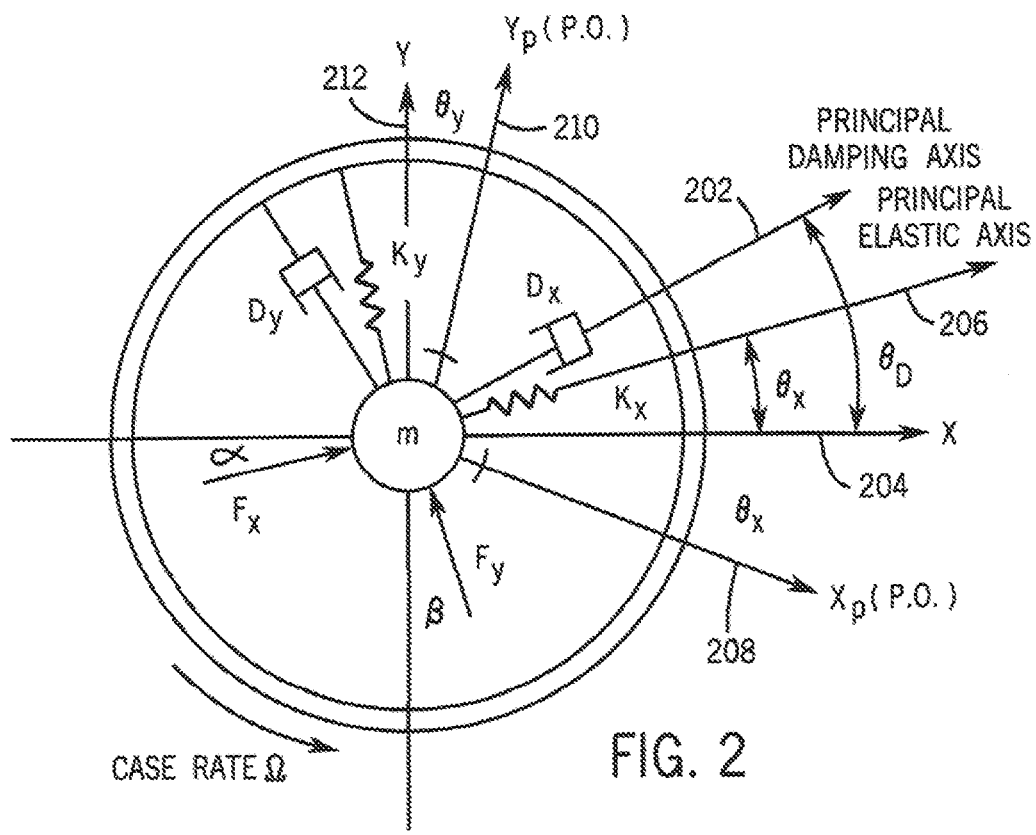
FIG. 2 is a diagram of an embodiment according to the present method and apparatus that explains the reason for driving the beam across the corners.

FIG. 2 is a diagram of an embodiment according to the present method and apparatus that explains the reason for driving the beam across the corners. The principal damping axis 202 is offset by $2_D$ from the X axis 204, and the principal elastic axis 206 is offset by $2_X$ from the X axis 204. $X_P$ 208 (X pickoff axis) is offset by $2_X$ from the X axis 204, and $Y_P$ 210 (Y pickoff axis) is offset by $2_Y$ from the Y axis 212.

Figure 3:
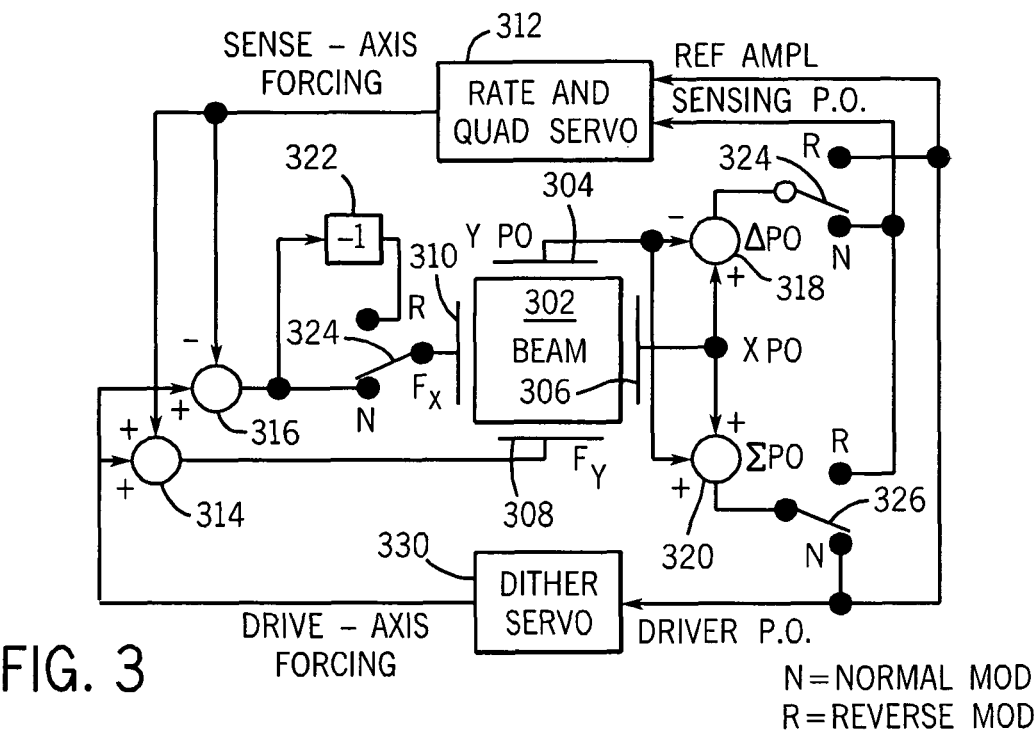
FIG. 3 is a block diagram of an embodiment according to the present method and apparatus.

FIG. 3 is a block diagram of an embodiment according to the present method and apparatus.

In this embodiment the beam 302 may be surrounded by electrodes 304, 306, 308, 310. A rate and quad servo 312 may be operatively coupled to the electrodes 304, 306, 308, 310 by summers 314, 316, 318, 320, inverter 322, and switches 324, 326, 328. A dither servo 330 may also be operatively coupled to the electrodes 304, 306, 308, 310 by summers 314, 316, 318, 320, inverter 322, and switches 324, 326, 328.

Optimum performance may be achieved when the driven axis acts along one of the orthogonal principal elastic axes.

For the dither drive, the X and Y forcer electrodes are driven approximately equally in either mode of operation. Note that the phase of the drive force is reversed on the X forcer for the Reverse mode (see the −1 gain for $F_X$, the X-forcer).

FIG. 3 shows the forcer electrodes as separate from the pickoff electrodes. In actuality, the electrodes are used for both pickoff and forcing. They are shown as separate electrodes to simplify the explanation and for simulating the effects of misalignment on the performance of the vibrating beam as a gyro.

In the normal mode, the sum of the pickoffs is used for driving the beam and the difference of the pickoff outputs is nulled by the capture servo. In the reverse mode, this operation is reversed so that the pickoff difference drives the beam and the sum is used for nulling.

Regarding Modal Frequency Separation, if the springs are not physically orthogonal as symbolically depicted in the model above (where the springs act along orthogonal principal axes) then in one embodiment the two frequencies cannot be made equal by trimming only their magnitudes.

Figure 4:
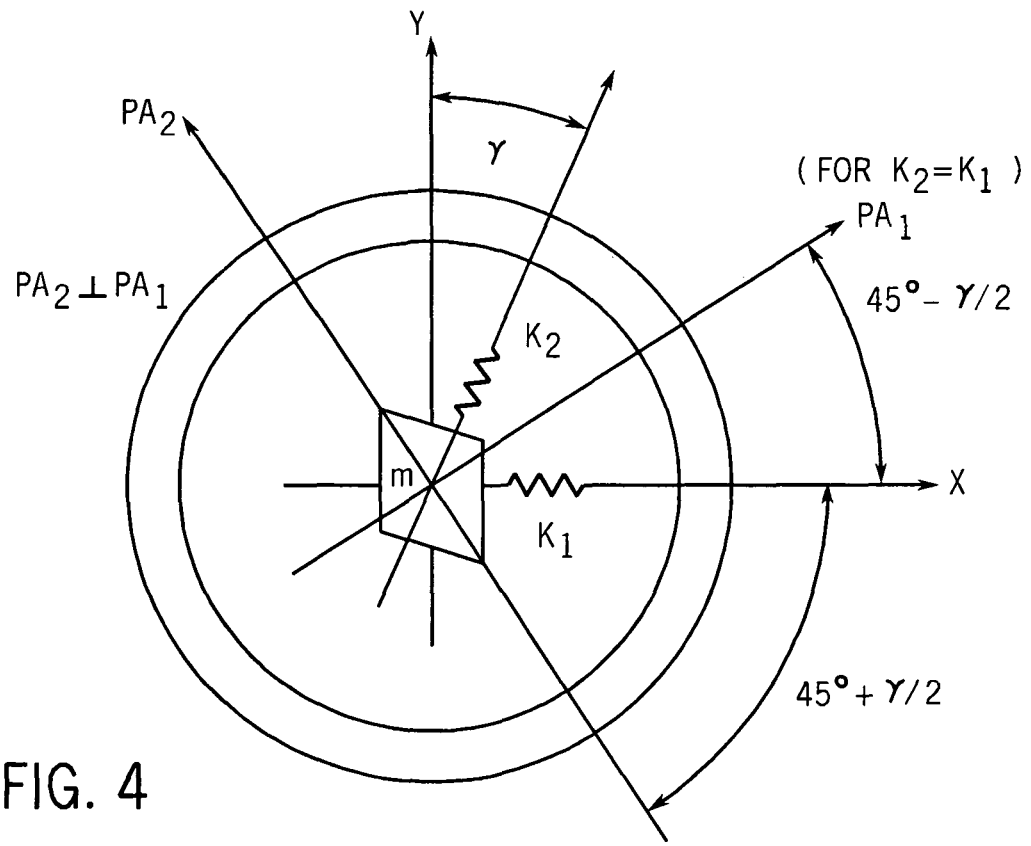
FIG. 4 is a block diagram of another embodiment according to the present method and apparatus.

FIG. 4 depicts this condition in an embodiment where $K_2$ is not orthogonal to $K_1$ by an amount $\gamma$.

If $K_1=K_2$ then one principal axis ($PA_1$) falls equally between the two springs (because of symmetry), and the other principal axis ($PA_2$) is at right angles to $PA_1$ as shown. So it can readily be seen that the stiffness for motion acting "between" the springs (along $PA_1$) is greater than the stiffness for motion acting "across" the two springs (along $PA_2$). From the equations of motion it can be shown that the frequency separation (for small $\gamma$) is approximately equal to $\gamma$ times the nominal frequency $\sqrt{K/m}$, where one frequency is higher by $\gamma/2$ and the other is lower by $\gamma/2$.

Since the "quadrature" error for the gyro is proportional to this difference frequency $\Delta\omega$ it is important that a technique be implemented to "pull" the springs into orthogonality in order to guarantee frequency coincidence. One technique is to orient one (or more) "negative" electrostatic springs at 45 degrees or approximately 45 degrees to the dither drive axis to maximize its effective "pull".

Finite element analysis shows that if the beam cross-section is not perfectly square, i.e., where the beam sides are not exactly orthogonal to one another, then the two frequencies in one example can never be made equal by trimming the thickness or width of the beam. At the very best, the difference frequency will still be equal to the nonorthogonality times the nominal frequency. The principal elastic axes will also rotate to 45 degrees to the sides.

The beam cross-section in one embodiment may be made as square as possible, i.e., the width and thickness of the beam will be made as close to equal as the processing permits. Therefore, the principal elastic axes will be nominally at 45 degrees (axes passing through the corners of the cross-section of the beam). Because of the techniques described above, the beam will also be driven into vibration substantially along these principal axes. In such a case the quadrature will be minimized.

FIG. 5 shows a table of the results of simulations for operation in both the normal mode and the reverse mode for various axis alignments, and for time-constant and resonant frequency differences along the principal axes. Note that in most cases the bias (and quadrature) measurements remain the same in either mode, but the scale factor reverses for rate inputs.

Figure 6:
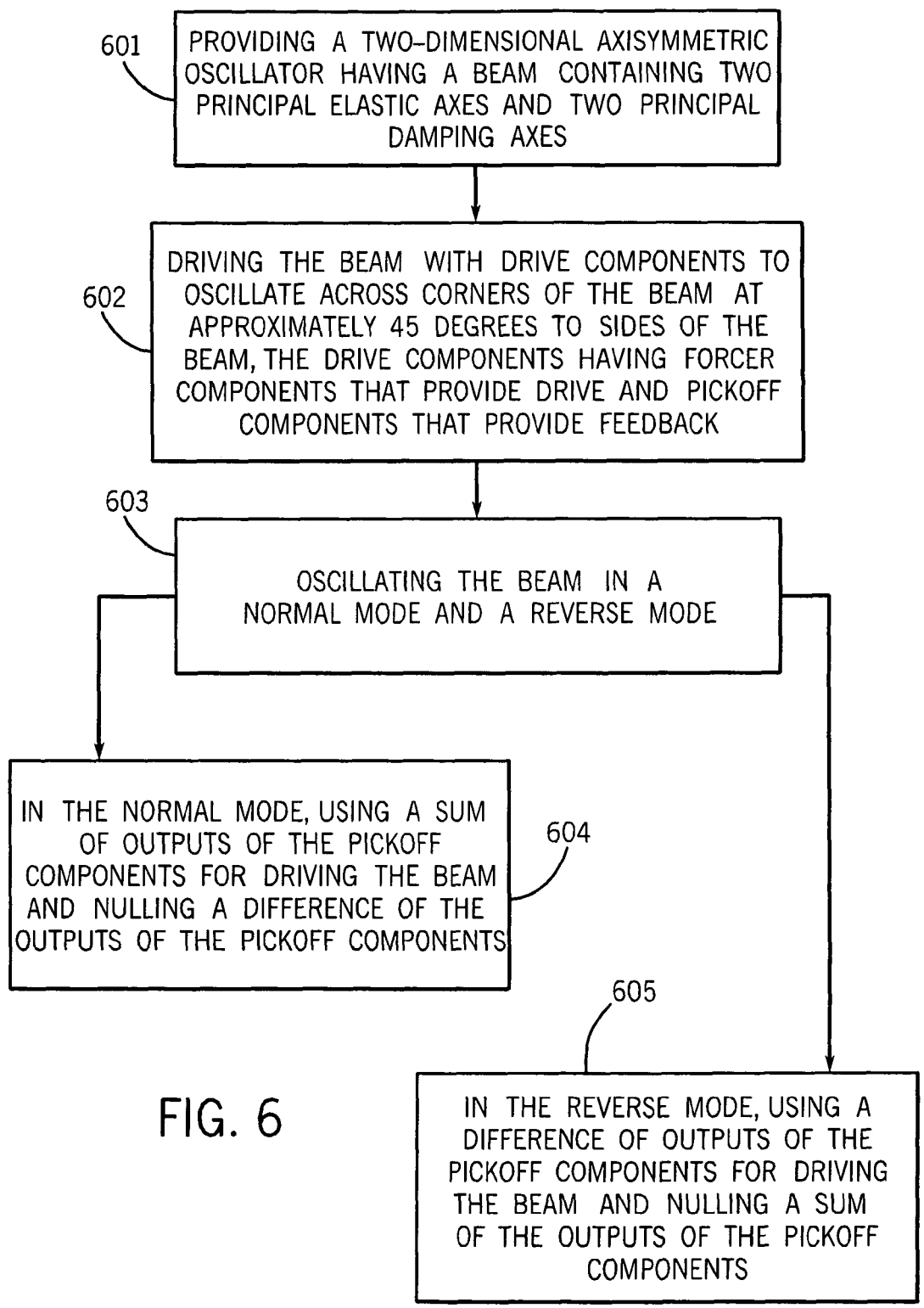
FIG. 6 depicts an embodiment of a method according to the present method.

FIG. 6 depicts an embodiment of a method according to the present method. This embodiment of the method may have the steps of: providing a two-dimensional axisymmetric oscillator such as a beam containing two principal elastic axes and two principal damping axes (601); driving the beam with drive components to oscillate across corners of the beam at approximately 45 degrees to sides of the beam, the drive components having forcer components that provide drive and pickoff components that provide feedback (602); and oscillating the beam in a normal mode and a reverse mode (603). In the normal mode, the method further comprises using a sum of outputs of the pickoff components for driving the beam and nulling a difference of the outputs of the pickoff components (604), and, in the reverse mode, using a difference of outputs of the pickoff components for driving the beam and nulling a sum of the outputs of the pickoff components (605).

The present apparatus in one example may comprise a plurality of components such as one or more of electronic components, hardware components, and computer software components. A number of such components may be combined or divided in the apparatus.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
   a two-dimensional oscillator having a beam containing two principal elastic axes and two principal damping axes, the beam being surrounded by electrodes comprised of forcer electrodes and pickoff electrodes;
   a rate and quad servo operatively coupled to the electrodes;
   a dither servo operatively coupled to the electrodes;
   a driven axis of the beam acting along one of the orthogonal principal elastic axes;
   for a dither drive, forcer electrodes driven approximately equally in either a normal mode of vibration and a reverse mode of vibration;
   wherein in the normal mode, a sum of outputs of the pickoff electrodes is used for driving the beam and a difference of the outputs of the pickoff electrodes is nulled by a capture servo coupled to the electrodes, and wherein in the reverse mode, a difference of the outputs of the pickoff electrodes is used for driving the beam and a sum of the outputs of the pickoff electrodes is nulled by the capture servo.

2. The apparatus according to claim 1, wherein the electrodes comprise at least one electrode configured to serve as both a forcer electrode and a pickoff electrode.

3. The apparatus according to claim 1, wherein the cross-section of the beam is a rhombus.

4. The apparatus according to claim 1, wherein the apparatus further comprises a frame that supports the beam in a plane, wherein a first direction comprises an in-plane direction, and wherein a second direction comprises an out-of-plane direction, wherein the first direction is substantially perpendicular to the second direction, and wherein the beam comprises a rectangular prism substantially symmetric for oscillation in both the first and second directions.

5. The apparatus according to claim 1, wherein during first and second time periods the beam is in an active angular rate sensing state, wherein between the first and second time periods the beam is in a transition state to achieve full amplitude oscillation in a second direction; wherein the apparatus further comprises first and second drive components that periodically switch the vibrating beam between the active angular rate sensing state and the transition state.

6. An apparatus, comprising:
   an oscillator having a vibrating beam containing two principal elastic axes and two principal damping axes;
   a source of direct current (DC) voltage operatively coupled to the drive components; and
   drive and sense components operatively coupled to the vibrating beam, the drive components driving the vibrating beam to oscillate across corners of the vibrating beam, the beam having a substantially square cross-section such that the principal elastic axes are at approximately 45-degree angles with respect to to the sides of the beam, whereby DC voltages applied to the drive components introduce negative electrostatic springs to effect a change in fundamental natural frequencies in the two principal axes of the beam, making them substantially the same to maximize Coriolis coupling between drive and sense axes and to effect minimized quadrature error for a gyroscope;

wherein the drive components comprise electrostatic drive components and capacitive pickoff components.

7. The apparatus according to claim 6, wherein the apparatus further comprises a means for reversing modes of vibration of the vibrating beam, and wherein a bias in an angular rate measurement of the beam, that normally occurs due to differential time-constant and quadrature that normally occurs due to unequal frequencies along the principal damping and principal elastic axes, is canceled when the modes are reversed via operation of the means for reversing modes of vibration of the vibrating beam.

8. The apparatus according to claim 6, wherein the cross-section of the beam is a rhombus.

9. The apparatus according to claim 6, wherein the apparatus further comprises a means for reversing modes of vibration of the vibrating beam, and wherein the drive components cancel a bias in a rate measurement of the vibrating beam with mode of vibration reversal.

10. The apparatus according to claim 6, wherein the apparatus further comprises a frame that supports the vibrating beam in a plane, wherein a first direction comprises an in-plane direction, and wherein a second direction comprises an out-of-plane direction, wherein the first direction is substantially perpendicular to the second direction, and wherein the vibrating beam comprises a rectangular prism substantially symmetric for oscillation in both the first and second directions.

11. The apparatus according to claim 6, wherein a first drive/sensor component for a first time period drives oscillation of the vibrating beam in a first direction, wherein the first drive/sensor component for a second time period senses Coriolis induced oscillation of the vibrating beam in the first direction; wherein a second drive/sensor component for the first time period senses Coriolis induced oscillation of the vibrating beam in a second direction, wherein the second drive/sensor component for the second time period drives oscillation of the vibrating beam in the second direction.

12. An apparatus, comprising:
a two-dimensional oscillator having a vibrating beam containing two principal elastic axes and two principal damping axes, the principal damping axes offset from a first axis of the beam, and the principal elastic axes offset from the first axis of the beam;
a first pickoff axis offset from the first axis of the beam, and a second pickoff axis offset from a second axis of the beam;
a source of direct current (DC) voltage operatively coupled to the drive components;
drive and sense components operatively coupled to the vibrating beam, the drive components driving the vibrating beam to oscillate across corners of the vibrating beam, whereby DC voltages applied to the drive components introduce negative electrostatic springs to effect a change in fundamental natural frequencies in the two principal axes of the beam, making them substantially the same to maximize Coriolis coupling between drive and sense axes and to effect minimized quadrature error for a gyroscope; and
wherein the drive components are electrostatic drive components and capacitive pickoff components.

13. The apparatus according to claim 12, wherein the principal damping axes are offset by a first predetermined amount from a first axis of the beam, and the principal elastic axes are offset by a second predetermined amount from the first axis of the beam.

14. The apparatus according to claim 12, wherein a first pickoff axis is offset by a first predetermined amount from a first axis of the beam, and a second pickoff axis is offset by a second predetermined amount from a second axis of the beam.

15. The apparatus according to claim 12, wherein the apparatus further comprises a means for reversing modes of vibration of the vibrating beam, and wherein a bias in an angular rate measurement of the beam, that normally occurs due to differential time-constant and quadrature that normally occurs due to unequal frequencies along the damping and elastic principal axes, is canceled when the modes are reversed via operation of the means for reversing modes of vibration of the vibrating beam.

16. The apparatus according to claim 12, wherein the apparatus further comprises a means for reversing modes of vibration of the vibrating beam, and wherein the drive components cancel a bias in a rate measurement of the vibrating beam with mode of vibration reversal.

17. The apparatus according to claim 12, wherein a first drive/sensor component for a first time period drives oscillation of the vibrating beam in a first direction, wherein the first drive/sensor component for a second time period senses Coriolis induced oscillation of the vibrating beam in the first direction; wherein a second drive/sensor component for the first time period senses Coriolis induced oscillation of the vibrating beam in a second direction, wherein the second drive/sensor component for the second time period drives oscillation of the vibrating beam in the second direction.

* * * * *